United States Patent [19]

Svarz et al.

[11] 4,000,195

[45] * Dec. 28, 1976

[54] METHOD OF PRODUCING ACRYLAMIDE WITH A RANEY COPPER CATALYST

[75] Inventors: Jerry J. Svarz, La Grange; Louis A. Goretta, Naperville, both of Ill.; Virgil L. Seale, Houston, Tex.

[73] Assignee: Nalco Chemical Company, Chicago, Ill.

[ * ] Notice: The portion of the term of this patent subsequent to Nov. 18, 1992, has been disclaimed.

[22] Filed: Feb. 24, 1975

[21] Appl. No.: 552,031

Related U.S. Application Data

[63] Continuation of Ser. No. 458,435, April 5, 1974, Pat. No. 3,920,740, which is a continuation-in-part of Ser. No. 408,238, Oct. 19, 1973, abandoned, which is a continuation-in-part of Ser. No. 280,686, Aug. 14, 1972, abandoned.

[52] U.S. Cl. .................. 260/561 N; 252/477 Q
[51] Int. Cl.$^2$ ........................................ C07C 103/12
[58] Field of Search ............ 260/561 N; 252/477 Q

[56] References Cited

UNITED STATES PATENTS

| 3,766,088 | 10/1973 | Yoshimura et al. | 260/561 N |
|---|---|---|---|
| 3,767,706 | 10/1973 | Habermann et al. | 260/561 N |

*Primary Examiner*—C. Davis
*Attorney, Agent, or Firm*—Hill, Gross, Simpson, Van Santen, Steadman, Chiara & Simpson

[57] ABSTRACT

An improved process for making acrylamide from a composition of acrylonitrile and water utilizing an improved Raney copper catalyst which contains from about 2 to 45 weight percent of aluminum on a 100 weight percent total weight basis. Preferably, this catalyst is prepared under low temperature, and/or slow caustic addition conditions from a copper aluminum alloy. The process can be practiced continuously for extended periods of time at high reaction rates and high conversion yields even when employing concentrated acrylonitrile starting feeds.

13 Claims, 7 Drawing Figures

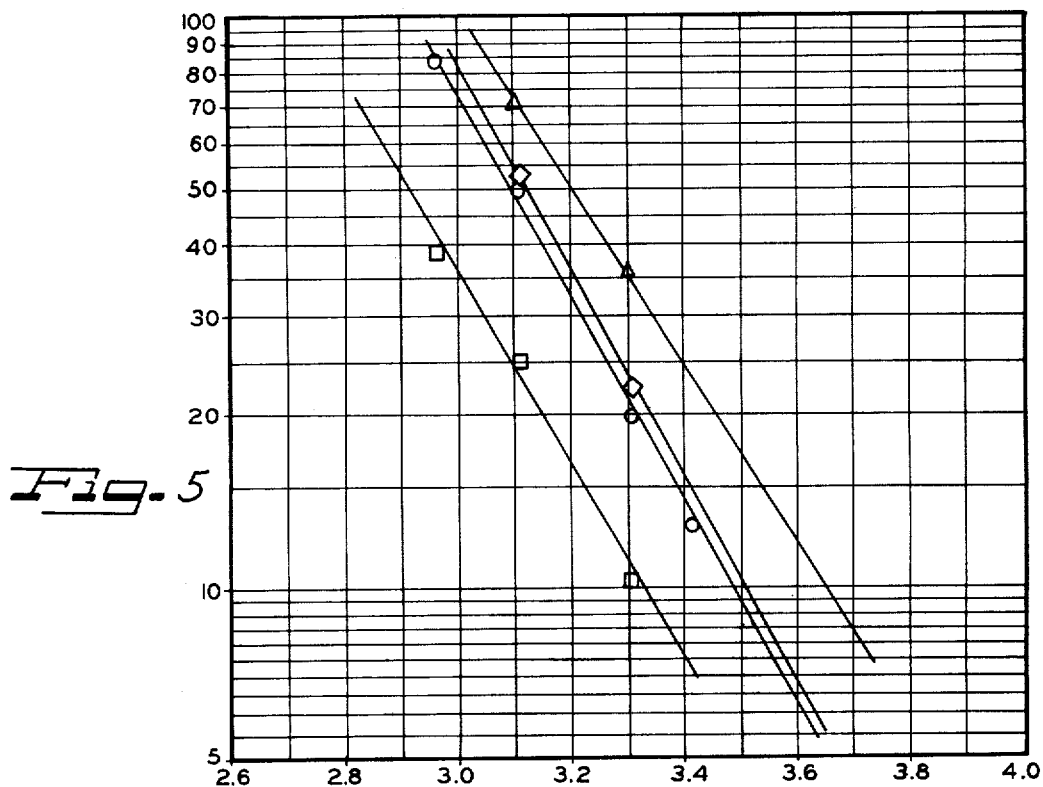
Fig. 5
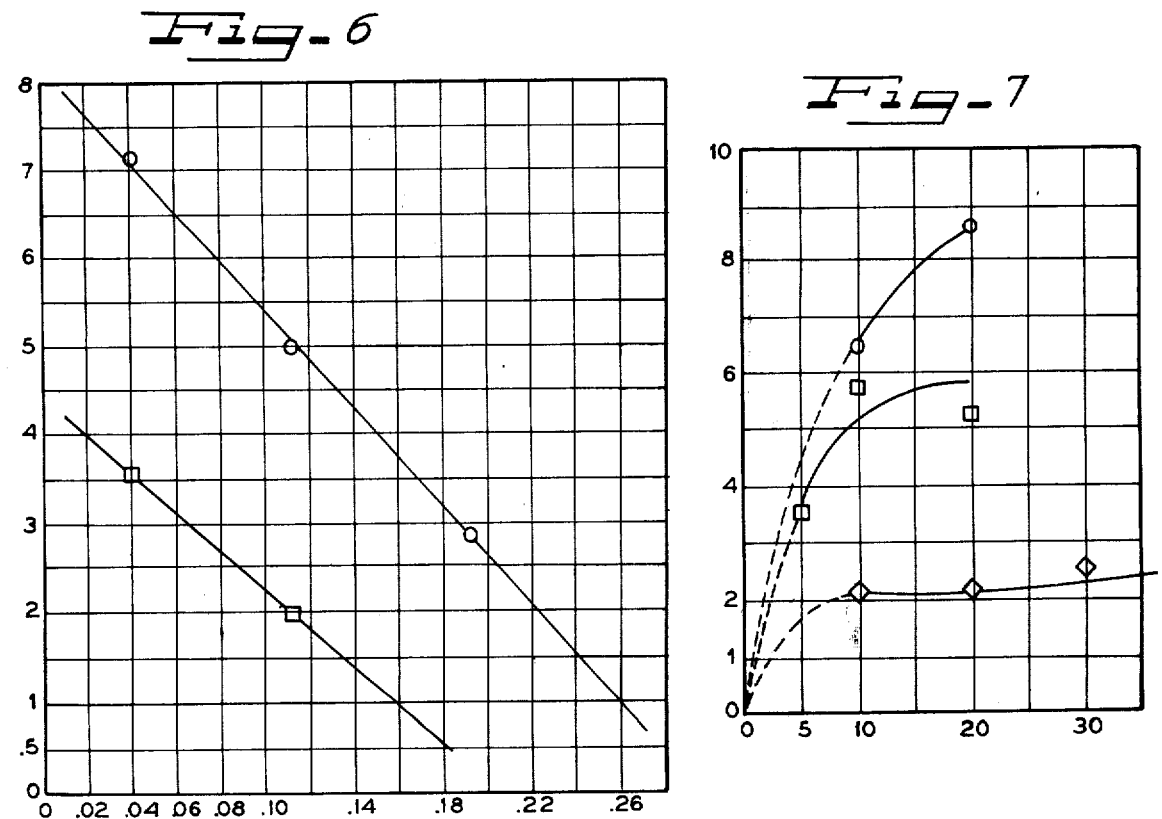
Fig. 6
Fig. 7

METHOD OF PRODUCING ACRYLAMIDE WITH A RANEY COPPER CATALYST

RELATED APPLICATION

This application is a continuation of application Ser. No. 458,435, filed Apr. 5, 1974, now U.S. Pat No. 3,920,740, which is a continuation-in-part of now abandoned application 408,238, filed Oct. 19, 1973, the latter of which is a continuation-in-part of now abandoned application Ser. No. 280,686, filed Aug. 14, 1972.

BACKGROUND OF THE INVENTION

In the art of catalytically hydrolyzing acrylonitrile with water to acrylamide, various copper and copper containing catalysts have been proposed, such as mixtures of copper oxide with other metal oxides, reduced copper oxide metal oxide mixtures, copper and copper/metal mixtures (see U.S. Pat Nos. 3,597,481; 3,631,104; 3,642,894; and 3,642,643). The use of Raney copper catalysts for this purpose is shown in Ger. Pat. No. 2,036,126, German DOS 2,164,185 (1972), Canadian Pat. 839,384 (1972) and apparently also in Asahi et al Japanese Publication 69/5205 (published Apr. 3, 1969; filed May 13, 1966 as Jap. Application No. 66/29,948). Based upon the method of catalyst preparation, it would appear that such prior art can be cataloged into two groups, one group involving the reduction of a copper containing compound or compounds, the other group involving the activation of a copper or copper alloy (such as Raney copper). See also U.S. Pat. No. 3,767,706.

So far as can be determined, when using a Raney copper catalyst to hydrolyze acrylonitrile to acrylamide by the teachings of the prior art, it has been the practice to prepare such catalyst in the manner of Kawaken Fine Chemicals Co., Ltd. of Tokyo, Japan (see, for example, the above referenced Canadian Pat. No. 839,384 at p. 5 where it is indicated that the Raney copper catalyst there used was obtained from Kawaken Fine Chemicals Co.,). Kawaken Fine Chemicals Co. report in their trade literature that the starting alloy (for example a 50:50 weight ratio mixture copper and aluminum) is crushed, screened to size, and immersed into aqueous alkali to dissolve out virtually all of the aluminum, after which the resulting activated product is kept under water or inert solvents to avoid oxidation. Apparently complete aluminum removal was heretofore believed to be desirable for purposes of enhancing catalyst activity for this intended hydrolysis reaction.

A recent study of the immersion of such alloy particles into aqueous alkali suggests adverse effects upon catalyst activity are caused by overheating of alloy particles during activation with caustic. For example, when about 20 to 30 wt. % sodium hydroxide dissolved in water is contacted with starting alloy particles at the ratio of about 100 to 120 weight percent total caustic per 100 parts starting alloy particles with the alkali solution being maintained at a fixed temperature in the range from about 140° to 248° F and with particle immersion time in such solution of 2 to 3 hours, heat is generated in a relatively short initial period in the immersion during which the aluminum is rapidly reacted away from the starting alloy. Presumably, the individual particles experience on their surfaces strong localized heating during this period. Such a thermal history, for reasons not altogether clear, is apparently responsible for a reduction in the catalytic activity of the product causticactivated Raney copper catalyst in the catalytic hydrolysis in water of acrylonitrile to acrylaminde. Such product catalyst produced by such immersion contains not more than about 0.5 weight percent aluminum on a 100 weight percent basis and this catalyst is typically in the form of a finely divided solid material.

Apparently, prior art Raney copper catalysts are prepared by changing starting alloy particles to a caustic solution. These particles are usually small in size to enhance and accelerate aluminum dissolution from the starting alloy and achieve thereby a maximum removal of aluminum initially present in such starting particles. This small particle, caustic activated product catalyst may be better suited for use as a suspension catalyst (see Mitsui Toatsu Chemicals, Ger. DOS 2,240,783) than as a fixed bed catalyst in such hydrolysis reaction. The characteristically low activity of catalysts produced in this manner just described dictates the use of a high surface area catalyst system, i.e. a system of very small catalyst particles, to enhance the hydrolysis rate of acrylonitrile to acrylamide (independently of reactant relative concentrations). These prior art catalyst particles have typically a limited or relatively low intial catalyst activity, and also have a relatively short half life. They are shown in the prior art on acrylonitrile hydrolysis to acrylamide to operate on dilute, starting aqueous acrylonitrile feeds.

Recent studies of Raney copper catalyst used in the art of hydrolyzing acrylonitrile to acrylamide show that the conditions of activation exert a profound influence upon the properties of the product catalyst in nitrile hydrolysis. Because of the limitations and shortcoming above indicated for prior art Raney copper catalysts, the art continues to seek a Raney copper catalyst adapted for such hydrolysis reaction which has a high initial activity and a long activity half life, and which, additionally, is particularly well suited for hydrolyzing acylonitrile in a concentrated acrylonitrile/water feed at a rapid rate and at a high conversion level. Preferably, it would be benficial to the art to have a Raney copper catalyst with such properties which, in addition, could readily be and conveniently prepared in particle sizes large enough to permit use of the activated product a fixed catalyst bed, as opposed to a suspension or fluidized bed system, for example.

BRIEF SUMMARY OF THE INVENTION

The present invention is directed to an improved catalytic hydrolysis process for making acrylamide from a starting composition comprising acrylonitrile and water. Typically, such a starting composition comprises from about 10 to 75 weight percent acrylonitrile with the remainder to 100 weight percent thereof being comprised of water. Preferably, such composition contains about 30 to 40 weight percent acrylonitrile (same basis). At these concentrations, the acrylonitrile and water are not completely miscible. The process is conducted under liquid phase conditions using temperatures in the range from about 150 to 300° F., with temperatures of from about 160 to 250° F. being presently preferred.

The process involves contacting such a composition with a particular type of Raney copper catalyst. This catalyst comprises from about 2 to 45 weight percent aluminum with the balance up to 100 weight percent being copper. More preferably, such catalyst comprises, on a 100 weight percent total weight basis, from about 9 to 40 weight percent aluminum with the balance up to 100 weight percent thereof being copper. This catalyst has an average particle size in the range from about 0.002 to 0.5 inch. This catalyst is prepared by a particular process.

Because of the characteristically high initial catalytic activity and the characteristically long life associated with a catalyst used in the process of this invention wherein acrylonitrile is hydrolyzed with water to acrylamide, as indicated above, the present invention provides an improved catalytic hydrolysis process which can be operated continuously and for extended periods of time with the same catalyst to produce desired, economically significant, high conversion yields of acrylamide from acrylonitrile at economically significant high rates of conversion. The invention is particularly useful, and the foregoing advantages are particularly well demonstrated, when using starting compositions containing a high, or concentrated acrylonitrile content.

In addition, the process of this invention offers operating efficiencies and economics, particularly in fixed bed catalytic processes. The process also allows continuous operations which are believed to be greater than heretofore known in this art.

The present invention provides an improved technique for activating a Raney copper catalyst for use in a process for hydrolyzing acrylonitrile to acrylamide under aqueous liquid phase conditions.

Further, the present invention aims to provide a Raney copper catalyst which permits one to hydrolyze acrylonitrile to acrylamide substantially free of by-product formation and achieve a higher initial activity together with a longer catalyst life than has heretofore been possible.

Other and further aims, objects, purposes, advantages, utilities and features will be apparent to those skilled in the art from a reading of the present specification and drawings.

DETAILED DESCRIPTION

Figure 1:
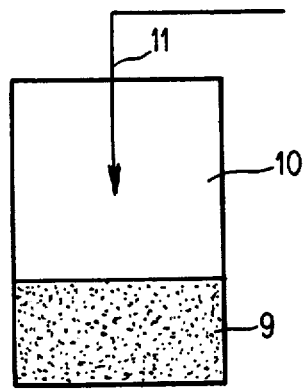
FIG. 1 is a diagrammatic representation of one mode of preparing a catalyst suitable for the process of the present invention.

The catalyst used in the practice of the present invention is a Raney copper foraminous catalyst which has been specially activated. The starting material for this catalyst is a preformed binary Al/Cu alloy which contains a weight percent ratio of Al/Cu in the range from about 70:30 to 30:70 (preferably about 45:55 to 55:45, and most preferably about 50:50). The alloy particles further initially have average particle diameters in the range of from about 0.002 to 0.5 inch. This catalyst is further characterized by having a relative activity of at least about 2, and preferably in the range from about 2.5 to 3.5. For purposes of the present invention "relative activity" is measured as described in Example 5 hereinbelow.

This catalyst is, in general, preparable by contacting a group of copper-aluminum alloy particles with a liquid aqueous medium containing dissolved therein alkali metal hydroxide. The contacting is done while maintaining a reaction rate between said particles and said hydroxide in said medium such that less than about 0.02 (preferably less than about 0.01) moles of hydrogen per mole of said aluminum initially present in said alloy on a 100 weight total initial alloy basis is evolved per minute. The contacting is conducted while keeping the bulk temperature in said medium in the region of said group in the range from about 32° to 180° F about (0° to 82° C) and this contacting is continued until at least about 25 weight percent of said aluminum initially present in said alloy on a 100 weight percent total initial alloy basis is removed.

The total number of moles of alkali hydroxide charged to said medium during the total time of said contacting is at least about 0.5 times the number of moles of aluminum initially present in said alloy particles. The total weight of water initially in said medium at the beginning of said contacting plus water added during said contacting ranges from about 100 to 1.5 times the total weight of said alkali metal hydroxide charged to said medium.

Thus, in one mode, activation of this starting alloy is accomplished by prolonged addition (contacting) timewise of an aqueous solution of alkali metal hydroxide (e.g., aqueous caustic) to a group of copper aluminum alloy particles. Such alkali metal hydroxide solution so added can contain from about 1 to 40 weight percent dissolved hydroxide, preferably, though solutions of alkali metal hydroxide having higher caustic contents (up to solution saturation) may be employed as starting leaching compositions for use in preparation (actuation) of the catalyst used in the practice of the present invention. Alkali metal hydroxide may also be added as solid pellets or flakes, although handling of alkali metal hydroxide as a solution is generally preferred on a commercial scale for reasons of safety and economy. During such addition, the alkali metal hydroxide (leaching composition) reacts with and dissolves the aluminum in the starting alloy in amounts such that the amount of aluminum remaining in the so-leached solid catalyst product ranges from about 2 to 45 weight percent (based on total leached product weight), and preferably from about 9 to 40 weight percent (same basis), but at least about 25 weight percent of the aluminum, and preferably at least about 35 weight percent, thereof, initially present in said alloy on a 100 weight percent total initial alloy basis is removed.

In preparing the catalyst, the caustic solution and the resulting aqueous medium which contacts the copper/aluminum metal alloy have temperatures in the range from about 32° to 180° F (and preferably temperatures in the range from about 60° to 120° F). The group of starting alloy particles has a particle size diameter in the range from about 0.002 to 0.5 inch, as indicated, and the copper/aluminum alloy has a starting copper to aluminum weight ratio of from about 30:70 to 70:30.

In this mode, the total time of contacting of caustic solution with such particles is typically and preferably accomplished over a total time interval of from about 2 to 30 hours, although longer times may be employed even up to 200 hours, with the fresh or starting caustic solution preferably being added (contacted) gradually to such particles over this time interval. The starting alloy particles may be initially immersed in water before being contacted with caustic solution. The resulting aqueous medium to which the starting hydroxide solution is added can typically contain from about 0.5 to 40 weight percent (total medium basis) of dissolved alkali metal hydroxide; the starting alkali metal hydroxide solution can contain from about 1 to 50% weight percent, more or less, of dissolved alkali metal hydroxide. In this mode, the contact rate between a starting caustic (alkali metal hydroxide) solution and a group of copper/aluminum alloy particles ranges during such contacting from about 0.01 to 7.0 moles of caustic (alkali metal hydroxide) per mole of aluminum initially present in the alloy particles per hour.

As indicated, the alkali metal hydroxide is added incrementally to the reaction zone. It will be appreciated that the term "incrementally" as used herein is inclusive of both continuous alkali metal hydroxide addition as well as discontinuous addition. Continuous alkali metal hydroxide is preferred for reasons of production simplicity. For present purposes, the contact rate is equivalent to the addition rate, generally.

The total quantity of alkali metal hydroxide so added to the particle-contacting, alkali metal hydroxide medium ranges from about 0.5 to 20 moles of alkali metal hydroxide per mole of aluminum initially present in the alloy particles. After the alkali metal hydroxide has been completely added to such medium, the contacting is preferably continued.

In this mode of catalyst activation by incremental caustic addition, one can, for example, conveniently employ a total quantity of aqueous alkali metal hydroxide such that the total molar quantity of hydroxide used totals from about 1 to 5 times the total molar amount of aluminum it is desired to leach away, as when a batch preparation procedure is being employed where the aqueous hydroxide is being added to a vessel containing a fixed quantity of starting alloy, and such aqueous hydroxide leaching composition is allowed to accumulate in this vessel during the leaching operation. Alternatively, for example, one can employ a batch preparation procedure where the aqueous hydroxide used is continuously removed from the region of the alloy being leached after contact therewith so that fresh aqueous hydroxide can be continuously or intermittently brought into contact with such alloy being leached; in this procedure, one can employ a larger total quantity of starting leaching composition during the leaching operation.

During the contacting of starting alloy with such leaching composition, an aluminate (in solution or dispersion) and hydrogen gas are produced. Conveniently, the hydrogen gas is vented more or less at the rate generated from the reaction zone, and most of the aluminate is removed in the water of the leaching composition. As indicated, hydrogen evolution can be conventionally metered and used to control aluminum removal rate, if desired, but, in general, the contacting conditions used in the one mode herein above described involving incremental caustic addition can be used to produce a catalyst for use in this invention without direct measurement of hydrogen evolution especially after reaction variables are one chosen and established within the ranges above indicated.

In another mode of catalyst activation to produce a catalyst having an aluminum content and an activity as indicated above one can employ temperature control rather than contacting rate as a primary means of controlling production of desired catalyst from starting alloy particles with alkali metal hydroxide. When so using temperature control, those skilled in the art will appreciate that the alkali metal hydroxide aqueous medium initially contains at least about 1.0 weight percent dissolved alkali metal hydroxide (and preferably at least about 10.0 weight percent dissolved alkali metal hydroxide). The medium is preliminarily cooled to a temperature which is not above 100° F and which is preferably not above about 70° F before being contacted with the group of alloy particles. Optionally substantially all of said alkali metal hydroxide can be initially present in such medium, and such medium is initially bulk added to a reaction zone wherein the alloy particles are contained, and the bulk temperature is maintained below about 70° F during said contacting until at least about 25 weight percent, and preferably at least about 35 weight percent, (total initial alloy weight basis) of the aluminum is removed.

In catalyst activation using either incremetnal addition of caustic or low temperature, contacting is best achieved by maintaining the particles of alloy in a substantially fixed reaction zone. The particles may be in a substantially fixed spatial position, or, if they are small enough, they may be suspended in the fixed reaction zone in the alkaline aqueous reaction medium by means of agitation, medium circulation, or the like. Thus the alkaline medium can be continuously agitated, or when the particles are maintained in a relatively fixed spatial position, the medium can be circulated through and around such. It is preferred to avoid masses of particles to minimize deleterious heat exposure thereof.

As the base for use in the catalyst activation procedure, one can employ any alkali metal hydroxide however, for reasons of commercial availability, it is preferred to employ the sodium and potassium hydroxides industrially used and available generally commercially. It is preferred to conduct the activation under inert, nonoxidizing, atmosphere conditions, such as under a blanket of nitrogen gas, or a gas of the helium family, or the like.

Preferably, a catalyst for use in this invention is prepared in a contact time interval with aqueous alkali metal hydroxide solution which ranges from about 4 to 20 hours, and more preferably which ranges from about 6 to 12 hours.

In catalyst activation by this invention, a group of alloy particles is confined to a reaction zone, and such a caustic solution is added into such a reaction zone. The resulting solution produced in contacting is allowed to accumulate in such zone. The starting group of alloy particles may be initially wet with water, or may be initially substantially free from water, as desired. In one preferred mode the particles are initially immersed in water before contact with caustic. Catalyst activation is preferably conducted under conditions which minimize the rate of heat release from the highly exothermic reaction between base and starting alloy. As indicated, one convenient procedure is to employ small, incremental charges of leaching solutions during the reaction. In some instances as indicated the amount of aluminum removed may be monitored by measuring hydrogen evolved during the reaction. In other instances, analysis of the aluminum in the base solution may be used as a measure of aluminum removal from the alloy.

After the alloy has thus been activated with base (alkali metal hydroxide solution), it is then washed with water, preferably deionized or distilled, primarily to separate therefrom any remaining unreacted caustic. Conveniently, the resulting solid catalyst particles remaining are washed with water to a neutral pH (e.g. a pH below about 8 and preferably in the range of from about 7.0 to 7.5). The product catalyst can then be removed from the reaction or activation zone. Preferably the catalyst is wet screened to separate fines. The product catalyst can be stored, conveniently under water as in drums. Keeping the catalyst under water prevents oxidation thereof as by air, which occurs rapidly if the catalyst is allowed to have air or oxygen exposure.

To use in this invention, this washed catalyst is contacted with an aqueous composition comprising acrylonitrile and water, as indicated above, using temperatures as indicated above. The hydration reaction proceeds even when the amount of the catalyst used in this invention is very slight. For example, addition of such catalyst in an amount as low as about 0.01 gram per mole of acrylonitrile is sufficient to make the acrylonitrile hydrolysis reaction proceed. The greater the amount of catalyst used, the faster the reaction proceeds, other variables being constant, in general, thus permitting an increase in the amount of acrylamide produced. Consequently, the amount of catalyst employed per mole of starting acrylonitrile initially employed can preferably range from about 0.01 to 100 grams.

Acrylamide may be made from the mixture of acrylonitrile and water in accordance with the present invention using a suspension bed, or a fixed bed, of catalyst or combinations thereof. Two or more reactors may be connected in series. The reaction liquid and the catalyst particles as when a suspension bed system is employed, may be counter-currently moved to effect and enhance reaction.

The hydrolysis process of this invention may be practiced under atmospheric pressures or slightly above, the latter being preferred, but the process may be practiced at desired superatmospheric and subatmosphereic pressures depending upon equipment considerations. Inert gas atmospheres, such as provided by nitrogen, steam, or the like may be optionally employed to maximize the conversion of acrylonitrile to acrylamide at given process conditions. Batch processing may be used, but continuous is preferred.

When practicing the process of the present invention using such a Raney copper catalyst prepared as described herein and utilizing a suspension bed system, it is preferred to employ the Raney copper catalyst in the form of particles having average particle diameters in the range from about 0.002 to 0.100 inch. Similarly, when the present invention is practiced using the Raney copper catalyst in the form of a fixed bed, it is convenient and preferred to use the Raney copper catalyst in the form of particles having average particle diameters in the range from about 0.02 to 0.50 inch.

In another preferred catalyst preparation precedure, using the preferred route above described, the alloy particles are confined to a reaction zone. The caustic solution is first contacted with the group of particles of the zone and the resulting aqueous medium is gradually removed from the zone.

In another, more preferred, catalyst preparation procedure, using the preferred route above described, the resulting aqueous medium is so removed at a volumetric rate which is about equal to the rate of addition of said caustic solution.

In such a preferred procedure, substantially 100 weight percent of this so removed resulting aqueous medium can be recycled back into contact with the group of particles being activated. During such a recycle, the so recycled aqueous medium is admixed with at least a portion of fresh caustic solution before or during recycle contact with such group of particles.

Alternatively, less than 100 weight percent of the so removed resulting aqueous medium can be recycled back into contact with the group of particles. The balance up to 100 weight percent thereof is removed from the reaction zone and can be discarded. Caustic is preferably gradually added at a rate approximately equal to the rate at which the caustic is consumed through reaction with the aluminum in the alloy. The process may preferably be practiced continuously at a rate which is approximately equal to the rate of consumption.

When practicing the present invention it is preferred to prepare a catalyst with relatively large particles and to use a fixed bed catalyst in the reaction zone or zones employed. The amount of aluminum left in the catalyst after an activation, as described herein, can vary widely, but, in the case of an active catalyst used for fixed bed catalysis, it has been found that as much as about 10 to 15 weight percent aluminum (based on total catalyst weight) can be present in a catalyst without apparently affecting catalyst use and performance characteristics, such as conversion rate, throughput rate of reactants, catalyst life, catalyst activity, etc.

In preparing a catalyst for use in this invention, it will be appreciated that there is a very sensitive relationship between the temperature of activation and the time of caustic contact with starting alloy. In general, the higher the temperature the longer should be the time for caustic addition to provide an active catalyst, because under such conditions localized overheating of the catalyst particles is avoided or reduced to a minimum level. Localized overheating of alloy particles is believed to interfere with generation of a catalyst having the desired characteristics associated with a Raney copper catalyst prepared as described in the present invention and used in the hydrolysis reaction as described in the present invention. If one employs a rapid reaction between alloy particles and alkali metal hydroxide so that the hydrogen evolution rate is greater than that employed in the practice of this invention there is characteristically produced a lessening of catalyst activity. When the caustic concentration exceeds about 20 percent of the liquid aqueous media, careful temperature control must typically be exercised. Most typically, the more concentrated the caustic solution, the lower should be the reaction temperature and the shorter the contact time of caustic with alloy.

As used herein, the term "gradual" includes not only variations in process conditions but also incremental or intermittent addition of alkali to alloy particles, or removal of a resulting aqueous medium from the zone of a given activation reaction. As can be determined from the preceeding teachings, a reduction of the reaction rate of aluminum with caustic in generating a catalyst for use in this invention is desired in order to produce an active material. Such a reduction may be achieved, generally, by limiting the amount of caustic present so that the caustic is replaced in solution at a rate equal to the rate at which it is being consumed. In this way a deviation between the alloy particle temperature and the caustic solution temperature will be minimized, resulting in an acitve catalyst, as desired.

Referring to FIGS. 1 through 4, as those skilled in the art will appreciate, there are seen four equipment configurations each one of which can be used to treat a group of starting alloy particles with aqueous caustic solution to produce an activated Raney copper catalyst for use in the practice of the process of the present invention, provision being made to vent hydrogen generated. Thus, in FIG. 1, there is seen an equipment configuration where a group of particles 9 are confined to a reaction zone 10 and a caustic solution is added into the zone 10. The liquid added into zone 10 through pipe 11 is allowed to accumulate in the zone 10. At the end of the caustic addition, in accordance with the preferred catalyst activation procedure of the present invention, and after caustic addition is terminated, the resulting treated particles 9 are removed from zone 10 as taught above. The particles 9 may be either initially wet with water or substantially free from water before caustic addition is commenced. In one preferred mode, the particles 9 are immersed in water.

Figure 2:
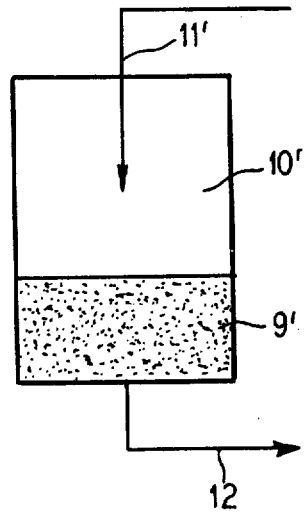
FIG. 2 through 4 each show representations similar to FIG. 1 but illustrating second, third, and fourth modes, respectively, the effect on reaction rate of temperature, particle size, and caustic concentration.

In FIG. 2 is shown a system similar to FIG 1; corresponding parts thereof are similarly numbered but with the addition of prime marks thereto. The system of FIG. 2 is equipped with a drain arrangement 12 which permits one to remove gradually from the vicinity of the group of particles 9' the medium which results after the caustic solution has been brought into contact with the group of particles 9'. Preferably the resulting aqueous medium is so removed at a volumetric rate which is about equal to the rate of addition of the starting caustic solution.

Figure 3:
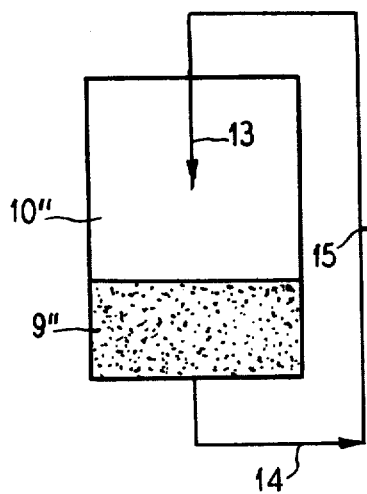

In FIG. 3 is shown another system in which the parts similar to those of FIG. 1 are similarly numbered but with the addition of double prime marks thereto. Here, caustic solution is gradually added into reaction zone 10" through a conduit 13. After the caustic solution from conduit 13 has contacted the group of particles 9", the resulting aqueous medium is gradually removed through a conduit 14. In conduit 14 this resulting aqueous medium is conveyed to a connection region 15 where conduit 14 is interconnected with a conduit 16. Fresh caustic solution is conveyed through conduit 16 and is mixed with the aqueous medium in conduit 14 in the region of connection 15 so that a mixture of the aqueous medium and fresh caustic solution results which mixture is then conveyed through conduit 13 back into the reaction zone 10", as shown. Such a system as shown in FIG. 3 permits economical use of caustic, as those skilled in the art will appreciate.

Figure 4:
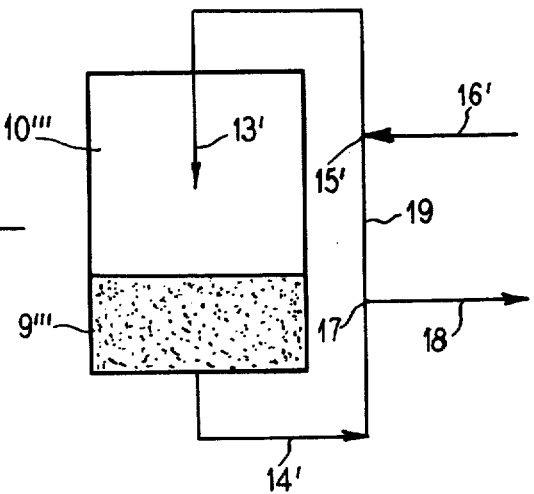

In FIG. 4 is shown another system in which the parts similar to those of FIG. 1 are similarly numbered but with the addition of triple prime marks thereto. Here caustic solution is gradually added into the reaction zone 10''' through a conduit 13'. After the caustic solution from conduit 13' has contacted the group of particles 9''', the resulting aqueous medium is gradually removed through a conduit 14' in conduit 14, this resulting aqueous medium is conveyed to a connection 17. At connection 17 a portion of the resulting medium is removed through a conduit 18, affluent from conduit 18 may be discarded or otherwise disposed safely if desired. The term portion here has reference to any fraction of the resulting medium ranging from greater than 0 to less than 100 weight percent or volume percent thereof. That portion of the resulting medium which is not removed from conduit 18 is conveyed by conduit 19 in connection region 15', where conduit 19' is connected with a conduit 16'. Fresh caustic solution is conveyed through conduit 16' and is mixed with the aqueous medium in conduit 19 in the region of connection 15' so that a mixture of the aqueous medium and fresh caustic solution results, which mixture is then conveyed through conduit 13' back into the reaction zone 10''', as shown. Such a system as shown in FIG. 4 permits economical use of caustic and in addition permits one selectively to remove spent caustic and accumulated aluminate salts from the system during catalyst activation, as those skilled in the art will appreciate.

In each of the systems of FIGS. 2, 3 and 4, the group of particles 9', 9" or 9''', respectively may be either initially wet with water or substantially free from water, and in one preferred mode such respective groups of particles 9', 9" or 9''', are immersed in water initially. As those skilled in the art will appreciate the representations in FIG. 1 through 4 are in no way to be considered as limiting the actual conduit arrangement, method of caustic addition or resulting medium removal, equipment orientation, or the like. Thus, for example, while for simplicity, gravitational type systems are shown in FIGS. 1 through 4, a system based on horizontal flow or vertical flow can be employed if desired, or some combination of flow directions of fluid over alloy particles during catalyst activation.

FIGS. 5, 6 and 7 illustrate for a particular catalyst the type of characteristic behavior associated in the practice of the process of the present invention using the catalyst described herein. Detailed description of these individual plots appear in the examples below.

In a catalyst prepared as described herein for use in the process of this invention, the aluminum content is somewhat variable. In general, it is not necessary to remove substantially all of the aluminum present in the starting alloy as has heretofore been taught in the art for the preparation of Raney copper catalysts (see the Kawaken reference). In general, a catalyst prepared for use in the present invention has at least two weight percent of aluminum contained therein. The exact form of this aluminum from a chemical viewpoint is not known; it is possible that this aluminum is not in a pure form but rather in the form of some compound or alloy with copper or other element. The exact chemical nature of the aluminum present in a catalyst used in this invention is unknown presently.

It is a special feature of the present invention that relatively high quantities of aluminum can be present without interfering with the desired relative activity desired and needed in a catalyst used in the process of this invention as herein taught. In general, one can produce a catalyst having an aluminum content as much as 35% and still have a relative acitivity of at least about 2.0.

In general, when preparing a catalyst by the procedure as described herein, it appears to be relatively easier to remove more aluminum from small sized starting alloy particles than it is to remove aluminum from larger sized alloy particles and still achieve relative activities as desired. In one preferred mode of preparing a catalyst for use in the process of this invention, one starts with alloy particles which have sizes in the range of from about 0.02 to 0.5 inches and the amount of aluminum removed from the particles through contact with aqueous alkali metal hydroxide is preferably between 35% and 90% of the aluminum initially present in the alloy particle, as conveniently determined through total hydrogen evolution during contacting or by the amount of soluble aluminum present in the aqueous alkali metal hydroxide medium after completing the contacting with the copper aluminum alloy particles. Hence a preferred catalyst for use in the process of this invention has an aluminum content of from about 9 to 40 weight percent (total catalyst weight basis), and activity of from about 2 to 3.5 measured as herein described, and a particle size in the range of from about 0.02 to .5 inches. As those skilled in the art will appreciate a catalyst within the size range just given is particularly well adapted for use in the process of this invention when one is employing a fixed bed catalyst system.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification.

EXAMPLE 1

Activation of Alloy to Raney Copper Catalyst

A leaching reaction to activate a 50:50 copper aluminum alloy is carried out using an apparatus arrangement as illustrated in FIG. 1. The alloy, which is in the form of particles ranging in size from about 0.09 to 0.13 inch average diameter size, is placed in a wire basket which is rotated in a 1 to 3 liter reaction flask. The flask is provide with a nitrogen purge inlet, a buret for caustic addition, a thermometer and a hydrogen outlet connected to a Wet Test Meter. Circulation of the leaching solution is accomplished by using a turbo-agitator.

After the alloy is placed in the basket mounted in the reactor flask, 6 gms of deionized water per gram of alloy is added to the flask and the agitator is set for about 120 r.p.m. Heating to a reaction temperature of 105° F. is undertaken concurrently with a 30 minute nitrogen purge. When the flask reaches 105° F. and the purge is completed, a 50 weight percent sodium hydroxide solution is added continuously over a 380 minute period to the system until 3 pounds of sodium hydroxide per pound of alloy have added, while controlling the temperature within ± 2° F. with external cooling.

The hydrogen evolution rate averages 0.0041 moles hydrogen per mole aluminum initially in the alloy particles per minute during the sodium hydroxide addition period. The hydrogen evolution rate subsequently decreases to a low level as conversion of aluminum approaches 80%.

After completing addition of sodium hydroxide, the reaction is continued until an estimated amount of about 80 to 90 weight percent of the total aluminum present in the starting alloy has been leached. The reaction rate is monitored by measuring hydrogen evolution every 15 to 30 minutes. Thereafter, the product catalyst is immediately removed from the leaching solution and placed into a large excess of deionized water. The product catalyst is rinsed with deionized water until the pH of the rinse water approaches 7.0 after which the product catalyst is stored under deionized water to prevent oxidation thereof.

EXAMPLE 2

ACTIVATION OF ALLOY TO RANEY COPPER CATALYST

A leaching reaction using an apparatus arrangement as illustrated in FIG. 2 to activate a 50:50 copper aluminum alloy is performed using a semi-batch fixed bed reactor constructed from ¾ inch outside diameter, 20 BWG tubing. The reactor is provided with a nitrogen purge inlet, a buret for caustic addition, a thermometer, and a hydrogen outlet connected to a Wet Test Meter.

At the bottom of the reactor a 3 to 4 inch bed of 4 mm glass beads are placed on top of which is positioned a charge of starting alloy, which is in the form of particles ranging from about 0.09 to 0.13 inch average diameter. A second bed of similar bead thickness is placed on top of the alloy charge in the reactor. Thereafter, deionized water is circulated through the bed while the reactor is being heated to 105° F.

Circulation of the leaching solution is accomplished by pumping a 1% caustic solution at a rate of 0.23 grams caustic per gram alloy per hour and allowing the resulting aqueous medium to be removed from the reactor at a rate approximating the pumping rate. The total quantity of caustic charged is 1.5 gms per gram of alloy. A liquid level, sufficient to immerse the alloy and resulting catalyst, is maintained during the activation with a liquid leg device so that greater heat transfer capabilities may be obtained.

The hydrogen evolution rate is 0.0039 moles hydrogen per mole aluminum initially present in the alloy per hour. When the unit reaches 105° F., the caustic solution is added until the total charge of about 3 grams of caustic per gram of alloy has been contacted with the alloy. The reaction is continued until about 20 to 90 weight percent of the total amount of aluminum estimated to be present in the starting alloy has been leached, based on hydrogen evolution. The reaction rate is evaluated by monitoring the hydrogen evolution every 15 to 30 minutes.

The resulting product catalyst is then washed with deionized water until the pH of the wash water reaches the range of from about 7 to 7.5. The product catalyst is then retained under water to prevent oxidation.

EXAMPLE 3

Activation of alloy to Raney copper catalyst

A leaching reaction using an apparatus arrangement as illustrated in FIG. 3 to activate a 50:50 copper aluminum alloy is performed using a ½ inch outside diameter semi-batch fixed bed reactor. The reactor is provided with a nitrogen purge inlet, a buret for caustic addition, a thermometer, and a hydrogen outlet connected to a Wet Test Meter. Circulation of the leaching solution is accomplished by using a pump that is connected in a closed loop to the fixed bed reactor.

At the bottom of the reactor a 3 to 4 inch bed of 4 mm glass beads are placed on top of which is positioned a charge of starting alloy, which is in the form of particles ranging from about 0.09 to 0.13 inch average diameter. A second bed of similar bead thickness is placed on top of the alloy charge in the reactor. Thereafter, a charge of 13.5 gms of deionized water per gram of alloy is recirculated through the bed while the reactor is being heated to 105° F. When the unit reaches 105° F., a 50 weight percent sodium hydroxide solution is begun to be added at a rate of about 0.23 of sodium hydroxide per gram of aluminum initially present in the alloy per hour until a total charge of about 1.5 grams of sodium hydroxide per gram of alloy have been added. The reaction is continued until about 80 to 90 weight percent of the total amount of aluminum estimated to be present in the starting alloy has been leached, based on hydrogen evolution. The reaction rate is evaluated by monitoring the hydrogen evolution every 15 to 30 minutes. The hydrogen evolution averages 0.0039 moles hydrogen per mole aluminum initially in alloy per minute during sodium hydroxide addition.

The resulting catalyst is then washed with deionized water until the pH of the wash water reaches the range of from about 7 to 7.5. The product catalyst is then retained under water to prevent oxidation.

EXAMPLE 4

Activation of alloy to Raney copper catalyst

A leaching reaction using an apparatus arrangement as illustrated in FIG. 4 to activate a 50:50 copper aluminum alloy is performed using a semi-batch fixed bed reactor constructed from ¾ inch outside diameter, 20 BWG tubing. The reactor is provided with a nitrogen purge inlet, a buret for caustic addition, a thermometer, and a hydrogen outlet connected to a Wet Test Meter. Circulation of the leaching solution is accomplished by using a pump that is connected in a closed loop to the bed reactor.

At the bottom of the reactor a 3 to 4 inch bed of 4 mm glass beads are placed on top of which is positioned a charge of starting alloy, which is in the form of particles ranging from about 0.09 to 0.13 inch average diameter. A second bed of similar bead thickness is placed on top of the alloy charge in the reactor. Thereafter, deionized water is circulated through the bed while the reactor is being heated to 105° F. When the unit reaches 105° F., a 50 weight percent sodium hydroxide solution is begun to be added at a rate of 0.23 grams of sodium hydroxide per gram of alloy per hour until a total charge of about 2.3 grams of such sodium hydroxide per gram of alloy have been added. During the sodium hydroxide addition a portion of the resulting aqueous medium, approximating 25% of the total, is removed and the remaining 75% is recycled back to the reaction zone.

The reaction is continued until about 80 to 90 weight percent of the total amount of aluminum estimated to be present in the starting alloy has been leached, based on hydrogen evolution.

EXAMPLE 5

Hydration Activity

A tubular reactor is formed from a 12 inch length of ¾ inch stainless steel tubing with an internal diameter of 0.68 inches. The reactor is vertically positioned in a bath of water and is equipped to allow introducing feed at the bottom and withdrawing product from the top. The water bath is equipped with a heater and temperature controlled so the bath can be maintained at a preselected temperature.

When this reactor is used to determine the activity of a catalyst, during operation of this reactor, acrylonitrile and water are separately pumped from volumetrically calibrated feed tanks, combined, heated, and introduced into the bottom of the reactor. The reactor is maintained under pressure as necessary to allow maintaining liquid phase conditions. Product leaving the reactor is cooled before reducing pressure to atmospheric. Product is collected in a final receiver.

Samples of product are analyzed for weight % acrylamide, weight % acrylonitrile, and weight % water to determine conversion levels (100 weight percent total product weight basis).

The procedure to determine catalyst activity is as follows: A measured 150 gms of catalyst (on a dry weight basis) is charged to the tubular reactor so as to occupy approximately 90 cubic centimeters and a series of tests are run as previously described. The tests are run at different contact times with all other variables held constant as follows:

1. Arithmetic mean catalyst bed temperature of 175° F.

2. Feed composition 100 weight % basis of 25 weight % acrylonitrile and 75 weight % water.

Contact time is inversely measured as weight hourly space velocity (WHSV), which is defined as weight hourly feed rated divided by catalyst weight in the reaction zone.

The contact times are varied to bracket a 35% conversion level. The WHSV required for 35% conversion ($WHSV_{35}$) is estimated by graphical or statistical interpolation. The catalyst activity (a) is then calculated from the following expression:

$$a = 1.07 \, (WHSV_{35})$$

The ranges for catalyst activity are elsewhere herein indicated. All catalyst activity valves in this application are measured by the procedure described in this Example.

WHSV's in the range of 0.8 to 10.0 are useful starting points to bracket the space velocity required for 35% conversion ($WHSV_{35}$), the last being an abbreviation for weight hourly space velocity needed for 35% conversion.

For testing the activity of very small particles of catalyst in the range, say, from about 0.1 to 0.002 inch, one should use short runs and relatively short catalyst beds to avoid or to minimize pressure drops through the test bed.

TABLE 1

| Case | Catalyst Activation Conditions Temperature (°F) | NaOH Concentration % (1) | Weight Ratio of total NaOH to alloy | NaOH addition (2) time (minutes) | Total reaction time (hrs) | Contacting Method | Hydrogen Evolution rate (moles H₂ per mole A initially in alloy per min.) | % aluminum in Catalyst (3) | Activity |
|---|---|---|---|---|---|---|---|---|---|
| 1 | 85 | 20 | 1.2 | — | 4 | alloy particles are added to both of 20% NaOH aqueous solution | — | 31 | 1.0 |
| 2 | 85 | 20 | 1.1 | — | 4½ | | — | — | 1.38 |
| 3 | 85 | 20 | 1.3 | — | 5½ | | — | 66 | 1.0 |
| 4 | 85 | 20 | 1.5 | 49 | 4½ | method of example 1 | 0.009 | 36 | 2.0 |
| 5 | 85 | 20 | 1.5 | 90 | 7½ | | 0.0068 | 12 | 3.15 |
| 6 | 68 | 20 | 1.5 | 35 | 7 | | 0.0043 | 24 | 3.0 |
| 7 | 150 | 20 | 1.1 | 15 | 3 | method of example 2 | 0.0225 | 3 | 1.76 |
| 8 | 110 | 20 | 1.5 | 215 | 10 | | 0.005 | 12 | 2.8 |

Notes:
(1) NaOH concentration is calculated as the ratio of the weight of total NaOH (on a 100% NaOH basis) charged to the weight of initial charge of water plus the weight of 50% NaOH solution added times 100.
(2) The NaOH is added as a 50% solution at a substantially uniform rate over the indicated time period.
(3) Aluminum contents of the catalysts are indirectly estimated from total hydrogen evolved.

Table 1 summarizes the catalyst activation conditions used in preparing eight different catalysts and the catalyst activities which are determined by testing in the described manner. These examples demonstrate that catalysts activated by incrementally adding sodium hydroxide to a catalyst activation system have much higher activities than catalysts activated by adding alloy granules to a bath of aqueous sodium hydroxide solution, as demonstrated by Cases 1, 2, and 3 versus Cases 4, 5, 6, 7, and 8. These examples also demonstrate that conducting the reaction under mild conditions and low hydrogen evolution rates will result in catalysts of higher activity, as demonstrated by Case 7 versus Cases 4, 5, 6, and 8.

EXAMPLE 6

Hydrolysis process for testing catalyst life

A system for hydrolyzing acrylonitrile to acrylamide is a reactor in the design of a double pipe heat exchanger with a flow system as indicated in FIG. 2. The inner tube which constitutes the reaction zone which has a 5 foot length and is formed of 316 stainless steel and has a 1 inch outside diameter schedule 105 pipe. The inner tube is uniformly surrounded by a jacket which is provided with an inlet at the bottom of the jacket and also with an outlet at the top of the jacket to allow circulation of a heat transfer medium to remove heat generated from the reaction. A temperature sensing device is installed in the inner pipe to allow temperature measurments throughout the reaction zone.

During operation of the reactor, acrylonitrile and water are separately pumped from volumetrically calibrated feed tanks, combined, heated, and introduced into the bottom of the reactor. The reactor is maintained under pressure to allow maintaining liquid phase conditions. In this Example, the following process conditions apply to the operation in test of a catalyst prepared in the manner of Example 6:

| | |
|---|---|
| Reactor temperature | 220 ± 2F |
| Weight percent acrylonitrile in the feed | 35 ± 1% |
| Weight hourly space velocity | 1.5 ± 0.3 pounds of feed per pound of catalyst per hour. |

As previously mentioned, the catalyst here used in a nominal 50% copper, 50% aluminum alloy activated in the manner described in this invention. A quantitative analysis of this catalyst after activation indicates that the activated catalyst composition is 81 weight percent copper and 19 weight percent aluminum. The catalyst, which is in the form of particles ranging in size from about 0.06 to 0.125 inches in diameter, is typical of other catalysts prepared as taught herein and evaluated in the process of this invention.

Product leaving the reactor is cooled before being reduced to atmospheric pressure. Such product is collected in a final receiver and analyzed for acrylamide, acrylonitrile and water content. Based on these respective analyses, conversion level of acrylamide, and activity of the catalyst at a particular point in time, are each determined.

The following Table 2 shows conversion level to acrylamide as a function of time of continuous operation using the process system described in this Example. This Table indicates the low activity loss of a catalyst prepared as described in this invention and used in the process of this invention over a period of 541 continuous operating hours with a production of 243 pounds of acrylamide per pound of catalyst. The high conversion level that is obtainable after this 541 hours of

TABLE 2

| Test | Elapsed Operating Time* | % Conversion |
|---|---|---|
| 3 | 55 | 72.9 |
| 4 | 82 | 68.9 |
| 5 | 154 | 65.0 |
| 6 | 178 | 63.2 |
| 7 | 199 | 60.8 |
| 8 | 256 | 62.8 |
| 9 | 279 | 63.4 |
| 10 | 331 | 53.8 |
| 11 | 353 | 54.4 |
| 12 | 401 | 56.2 |
| 13 | 422 | 57.0 |
| 14 | 455 | 59.2 |
| 15 | 467 | 60.7 |
| 16 | 491 | 57.6 |
| 17 | 541 | 54.8 |

*Hours operation with this catalyst indicates the unexpected and surprising superiority of this catalyst over other Raney copper catalysts found in prior art and used in this hydrolysis reaction.

EXAMPLE 7

Reaction Rate Information

Using a method similar to the method of catalyst activation as described in Example 1, reaction rate information of this catalyst system is obtained. This information describes some of the kinetic rate information necessary to understand the reaction of a copper-aluminum alloy, as herein described, with caustic.

The reaction rate dependency on temperature is illustrated in FIG. 5 where an Arrhenius-Plot is shown. The ordinate is in units or reciprocal minutes, and is the reaction rate coefficient, K, wherein the values of K have been multiplied by 104. The abscissa is in the units of reciprocal degrees Kelvin and the value of the points on the abscissa have been multiplied by $10^3$.

The effect of catalyst particle size is found to linear over a particle diameter range of from about 0.04 to 2.0 inches, as illustrated by the data of FIG. 6. The ordinate in this FIGURE is in units of reciprocal minutes, and is the reaction rate coefficient, K, wherein the values of K have been multiplied by $10^3$. The abscissa is in units of inches diameter and reflects the average particle size diameter.

Variations in the caustic concentration can result in nonuniform changes in the reaction rate but such changes occur in an expected pattern, i.e., higher caustic concentrations yield a faster reaction rate and systems with the same caustic concentration react faster if the temperature or the NaOH to aluminum mole ratio is increased, as illustrated in FIG. 7. The oridinate is in units of reciprocal minutes, and is the reaction rate coefficient K, wherein the values of K have been multiplied by $10^3$. The abscissa is in the units of weight percent sodium hydroxide and represents the concentration of sodium hydroxide present in the activating solution.

This infomation is useful in preselecting catalyst activation conditions which result in desirably low reaction rates that will result in catalysts of high activity.

We claim:

1. In an improved process for catalytically hydrolyzing acrylonitrile to acrylamide under aqueous, liquid phase conditions in the presence of a copper catalyst, the improvement which comprises using as said catalyst a Raney copper catalyst which contains from about 2 to 45% by weight on a 100 weight percent total catalyst weight basis of aluminum.

2. The process of claim 1 wherein said Raney copper catalyst is comprised of particles having average particle diameters ranging from 0.002 to 0.5 inches and has a relative activity of at least about 2.

3. The process of claim 1 wherein said Raney copper catalyst comprises on a 100 weight percent total weight basis from about 9 to 40% by weight of aluminum with the balance up to 100 weight percent thereof being copper, said catalyst having an average particle size in the range from about 0.002 to 0.5 inch, said catalyst having a relative activity of at least about 2.

4. The process of claim 3 wherein said Raney copper catalyst is in the form of particles having average particle diameters from about 0.002 to 0.1 inch, which particles are suspended in the liquid phase and have a relative activity 2.5 to 3.5.

5. The process of claim 3 wherein said Raney copper catalyst ranging from about 0.02 to 0.5 inch, which particles are in the form of a fixed bed over and through which the reactants are passed and which catalyst particles have a relative activity of from about 2.5 to 3.5.

6. In an improved process for catalytically hydrolyzing acrylonitrile to acrylamide under aqueous, liquid phase conditions in the presence of a copper catalyst, the improvement which comprises contacting an aqueous, substantially liquid phase composition comprising from about 10 to 75 weight percent acrylonitrile with the remainder to 100 weight percent thereof being water maintained at a temperature of from about 150° to 300° F with a Raney copper catalyst which contains from about 2 to 35 weight percent aluminum on a 100 weight percent total catalyst weight basis, which has a relative activity of at least about 2, and which has an average particle size in the range from about 0.002 to 0.5 inch.

7. The process of claim 6 wherein said catalyst has a size ranging from about 0.002 to 0.1 inch in average particle diameters and is in a suspension bed system.

8. The process of claim 6 wherein said catalyst has a size ranging from about 0.02 to 0.5 inch and is a fixed bed system.

9. The process of claim 6 wherein the amount of catalyst employed per mole of starting acrylonitrile initially employed ranges from about 0.01 to 100 grams.

10. The process of claim 6 wherein said composition contains about 30 to 40 weight percent acrylonitrile.

11. The process of claim 6 wherein said temperature ranges from about 160° to 250° F.

12. The process of claim 6 wherein the quantity of aluminum present in said catalyst is not greater than about 75 weight percent based on total catalyst weight.

13. The process of claim 6 wherein said Raney copper catalyst has a relative activity of from about 2.5 to 3.5.

* * * * *